(12) United States Patent
Arimilli et al.

(10) Patent No.: US 6,397,303 B1
(45) Date of Patent: May 28, 2002

(54) DATA PROCESSING SYSTEM, CACHE, AND METHOD OF CACHE MANAGEMENT INCLUDING AN O STATE FOR MEMORY-CONSISTENT CACHE LINES

(75) Inventors: Ravi Kumar Arimilli; Lakshminarayana Baba Arimilli; James Stephen Fields, Jr.; Sanjeev Ghai, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,408

(22) Filed: Jun. 24, 1999

(51) Int. Cl.$^7$ ............................................... G06F 12/00
(52) U.S. Cl. ..................................................... 711/141
(58) Field of Search ..................... 711/122, 146, 711/118, 119, 114, 141, 145

(56) References Cited

U.S. PATENT DOCUMENTS 4,847,804 A * 7/1989 Shatter ........................ 364/900
5,671,391 A * 9/1997 Knotts ......................... 395/470

* cited by examiner

Primary Examiner—Matthew Kim
Assistant Examiner—Christian P. Chace
(74) Attorney, Agent, or Firm—Casimer K. Salys; Bracewell & Patterson, L.L.P.

(57) ABSTRACT

A multiprocessor data processing system includes an interconnect, a plurality of processing units coupled to the interconnect, and at least one system memory and a plurality of caches coupled to the plurality of processing units. A cache suitable for use in such a data processing system includes data storage containing multiple granules of data and a number of state fields associated with the granules of data. Each state field has a plurality of possible states including an O state indicating that an associated granule is consistent with corresponding data in the memory and has unknown coherency with respect to peer caches in the data processing system. Thus, a cache is permitted to store memory-consistent, but possibly non-coherent data in order to offer processing units in the data processing system lower latency to an image of system memory.

17 Claims, 4 Drawing Sheets

| L2 Initial States | | | L3 Initial States | | | L2 Snoop Responses | | | L3 Snoop Responses | | | Combined Response | Data Source | | State Transitions |
|---|---|---|---|---|---|---|---|---|---|---|---|---|---|---|---|
| A | B | C | A | B | C | A | B | C | A | B | C | | Sect 0 | Sect 1 | |
| I/I | I/I | I/I | I/I | I/I | I/I | Null | Null | Null | Null | Null | Null | Null | memory | memory | L2A=S/R, L3A=S/O |
| I/I | I/I | I/I | I/O | I/I | O/I | Null | Null | Null | Null, LP | Null | Null | Null, LP | L3C | L3A | L2A=S/R, L3A=S/O |
| I/I | I/I | I/I | I/S | I/I | S/I | Null | Null | Null | Null, LP | Null | Null | Null, LP | L3C | L3A | L2A=S/R, L3A=S/S |
| I/I | I/I | I/I | O/I | I/I | I/O | Null | Null | Null | L3O | Null | Null | L3O | L3A | L3C | L2A=S/R, L3A=S/O |
| I/I | I/I | I/I | S/I | I/I | I/S | Null | Null | Null | L3S | Null | Null | L3S | L3A | L3C | L2A=S/R, L3A=S/O |
| I/I | R/R | I/I | O/O | I/M | O/O | Null | L2O | Null | L3O, LP | Null/LP | Null | L2O, NP | L2B | N/A | L2A=S/I, L3A=S/O, L3C=S/O, L3B must update memory |
| I/I | M/M | I/I | O/I | I/I | I/I | Null | MOD NP | Null | L3O | Null | Null | MOD, NP | L2B | N/A | L2A=S/I, L3A=S/I, L3C=S/I, L2B must update memory |
| I/O | I/I | I/I | O/I | I/I | O/O | Null/ NP | Null | Null | Null | Null | Null | Null, NP | L3C | N/A | L2A=S/O, L3A=S/O, L3C=S/O |
| I/S | R/I | I/I | I/O | I/I | I/S | Null, NP | L2O | Null | Null, LP | Null | Null | L2O, NP | L2B | N/A | L2A=S/S, L3A=S/O, L2B=S/I |
| I/M | I/I | I/I | S/I | I/I | I/I | Null, NP | Null | Null | L3S | Null | Null | L3S, NP | L3A | N/A | L2A=S/M |
| I/I | R/I | I/I | O/I | I/I | I/I | Null | L2O | Null | Null | Null | Null | L2O | N/A | N/A | L3A=S/I, L2B=S/I |
| I/I | I/I | R/I | I/I | I/I | S/I | Null | Null | Null | Null | Null | Null | Null | N/A | N/A | L2C=S/I |
| I/I | M/I | I/I | O/I | I/I | S/I | Null | MOD | Null | Null | Null | Null | MOD | N/A | N/A | L3A=I/I, L3C=I/I |

Fig. 3

DATA PROCESSING SYSTEM, CACHE, AND METHOD OF CACHE MANAGEMENT INCLUDING AN O STATE FOR MEMORY-CONSISTENT CACHE LINES

CROSS-REFERENCE TO RELATED APPLICATIONS

This application is related to the following co-pending applications, which are filed on even date herewith and incorporated herein by reference:

(1) application Ser. No. 09/339,407;
(2) application Ser. No. 09/339,406;
(3) application Ser. No. 09/339,405; and
(4) application Ser. No. 09/339,404.

BACKGROUND OF THE INVENTION

1. Technical Field

The present invention relates in general to data processing and, in particular, to cache management in a data processing system. Still more particularly, the present invention relates to a data processing system, cache, and method of cache management having an O state for memory-consistent cache lines of unknown coherency.

2. Description of the Related Art

A conventional multiprocessor data processing system may comprise a system bus to which a system memory and a number of processing units that each include a processor and one or more levels of cache memory are coupled. To obtain valid execution results in such a multiprocessor data processing system, a single view of the contents of memory must be provided to all of the processors by maintaining a coherent memory hierarchy.

A coherent memory hierarchy is maintained through the implementation of a selected coherency protocol, such as the conventional MESI protocol. According to the MESI protocol, an indication of a coherency state is stored in association with each coherency granule (e.g., cache line or sector) of at least all upper level (i.e., cache) memories. Each coherency granule can have one of four states, modified (M), exclusive (E), shared (S), or invalid (I), which is typically indicated by two bits in the cache directory. The modified state indicates that a coherency granule is valid only in the cache storing the modified coherency granule and that the value of the modified coherency granule has not been written to (i.e., is inconsistent with) system memory. When a coherency granule is indicated as exclusive, the coherency granule is resident in, of all caches at that level of the memory hierarchy, only the cache having the coherency granule in the exclusive state. The data in the exclusive state is consistent with system memory, however. If a coherency granule is marked as shared in a cache directory, the coherency granule is resident in the associated cache and in at least one other cache at the same level of the memory hierarchy, all of the copies of the coherency granule being consistent with system memory. Finally, the invalid state generally indicates that the data and address tag associated with a coherency granule are both invalid.

The state to which each coherency granule is set can be dependent upon a previous state of the cache line, the type of memory access sought by processors to the associated memory address, and the state of the coherency granule in other caches. Accordingly, maintaining cache coherency in the multiprocessor data processing system requires that processors communicate messages across the system bus indicating an intention to read or write memory locations. For example, when a processing unit requires data not resident in its cache(s), the processing unit issues a read request on the system bus specifying a particular memory address. The read request is interpreted by its recipients as a request for only a single coherency granule in the lowest level cache in the processing unit. The requested cache is then provided to the requester by a recipient determined by the coherency protocol, and the requestor typically caches the data in one of the valid states (i.e., M, E, or S) because of the probability that the cache line will again be accessed shortly.

The present invention recognizes that the conventional read request/response scenario for a multiprocessor data processing system outlined above is subject to a number of inefficiencies. First, given the large communication latency associated with accesses to lower levels of the memory hierarchy (particularly to system memory) in state of the art systems and the statistical likelihood that data adjacent to a requested cache line in lower level cache or system memory will subsequently be requested, it is inefficient to supply only the requested coherency granule in response to a request.

Second, a significant component of the overall access latency to system memory is the internal memory latency attributable to decoding the request address and activating the appropriate word and bit lines to read out the requested cache line. In addition, it is typically the case that the requested coherency granule is only a subset of a larger data set that must be accessed at a lower level cache or system memory in order to source the requested coherency granule. Thus, when system memory receives multiple sequential requests for adjacent cache lines, the internal memory latency is unnecessarily multiplied, since multiple adjacent cache lines of data could be sourced in response to a single request at approximately the same internal memory latency as a single cache line.

SUMMARY OF THE INVENTION

In view of the above and other shortcomings in the art recognized by the present invention, the present invention introduces the O cache consistency state, which permits unrequested memory-consistent and possibly non-coherent data to be stored in a cache, thereby reducing a processor's access latency to memory-consistent data.

A multiprocessor data processing system that can implement the present invention includes an interconnect, a plurality of processing units coupled to the interconnect, and at least one system memory and a plurality of caches coupled to the plurality of processing units. A cache suitable for use in such a multiprocessor data processing system includes data storage containing multiple granules of data and a number of state fields associated with the granules of data. Each state field has a plurality of possible states including an O state indicating that an associated granule is consistent with corresponding data in the memory and has unknown coherency with respect to peer caches in the data processing system. Thus, a cache is permitted to store memory-consistent, but possibly non-coherent data in order to offer processing units in the data processing system lower latency to an image of system memory.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a state transition table summarizing cache state transitions, snoop responses, and combined responses for various transactions on the system interconnect of the data processing system shown in FIG. 1.

DETAILED DESCRIPTION OF ILLUSTRATIVE EMBODIMENT

System Architecture

Figure 1:
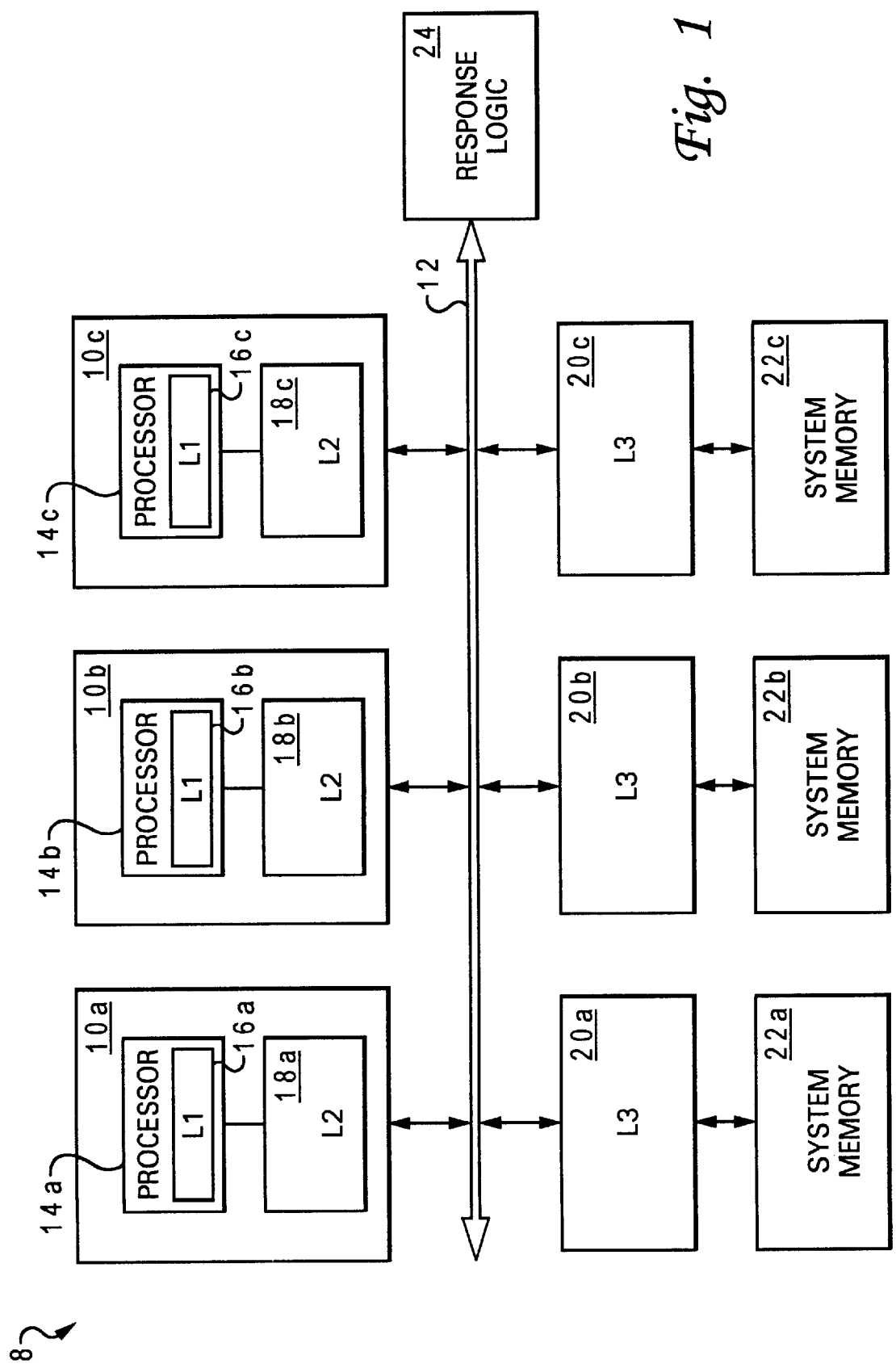
FIG. 1 depicts an illustrative embodiment of a first multiprocessor data processing system with which the present invention may advantageously be utilized.

With reference now to the figures and in particular with reference to FIG. 1, there is illustrated a high level block diagram of a first multiprocessor data processing system in accordance with the present invention. As depicted, data processing system 8 includes a number of processing units 10a–10c coupled to a system interconnect 12. Each processing unit 10 is an integrated circuit including one or more processors 14. In addition to the registers, instruction flow logic and execution units utilized to execute program instructions, each of processors 14 also includes an associated level one (L1) cache 16, which temporarily stores instructions and data that are likely to be accessed by the associated processor 14. Although L1 caches 16 are illustrated in FIG. 1 as unified caches that store both instruction and data (both referred to hereinafter simply as data), those skilled in the art will appreciate that each of L1 caches 16 could alternatively be implemented as bifurcated instruction and data caches.

As further illustrated in FIG. 1, the memory hierarchy of data processing system 8 also includes distributed system memories 22, which form the lowest level of volatile data storage in the memory hierarchy, and one or more lower levels of cache memory, such as on-chip level two (L2) caches 18 and off-chip L3 caches 20, which are utilized to stage data from system memories 22 to processors 14. As understood by those skilled in the art, each succeeding lower level of the memory hierarchy is typically capable of storing a larger amount of data than higher levels, but at a higher access latency. For example, in an exemplary embodiment, L1 caches 16 may each have 512 64-byte cache lines for a total storage capacity of 32 kilobytes (kB), all at single cycle latency. L2 caches 18 may each have 2048 128-byte cache lines for a total storage capacity of 256 kB at approximately 10 cycle latency. L3 caches 20 may each have 4096 256-byte cache lines for a total storage capacity of 1 MB, at a latency of approximately 40–60 cycles. Finally, each system memory 22 can store tens or hundreds of megabytes of data at an even longer latency, for example, 300–400 cycles. Given the large disparity in access latencies between the various levels of the memory hierarchy, it is advantageous to reduce accesses to lower levels of the memory hierarchy and, in particular, to system memories 22.

System interconnect 12, which can comprise one or more buses or a cross-point switch, serves as a conduit for communication transactions between processing units 10 and other snoopers (e.g., L3 caches 20) coupled to system interconnect 12. A typical transaction on system interconnect 12 begins with a request, which may include a transaction field indicating the type of transaction, source and destination tags indicating the source and intended recipient(s) of the transaction, respectively, and an address and/or data. Each device connected to system interconnect 12 preferably snoops all transactions on system interconnect 12 and, if appropriate, responds to the request with a snoop response. As discussed further below, such snoop responses are received and compiled by response logic 24, which provides a combined response indicating what action, if any, each snooper is to take in response to the request. These actions may include sourcing data on system interconnect 12, storing data provided by the requesting snooper, etc.

Those skilled in the art will appreciate that data processing system 8 can include many additional components, such as bridges to additional interconnects, I/O devices, non-volatile storage, ports for connection to networks or attached devices, etc. Because such additional components are not necessary for an understanding of the present invention, they are not illustrated in FIG. 1 or discussed further herein.

Cache Architecture

Figure 2:
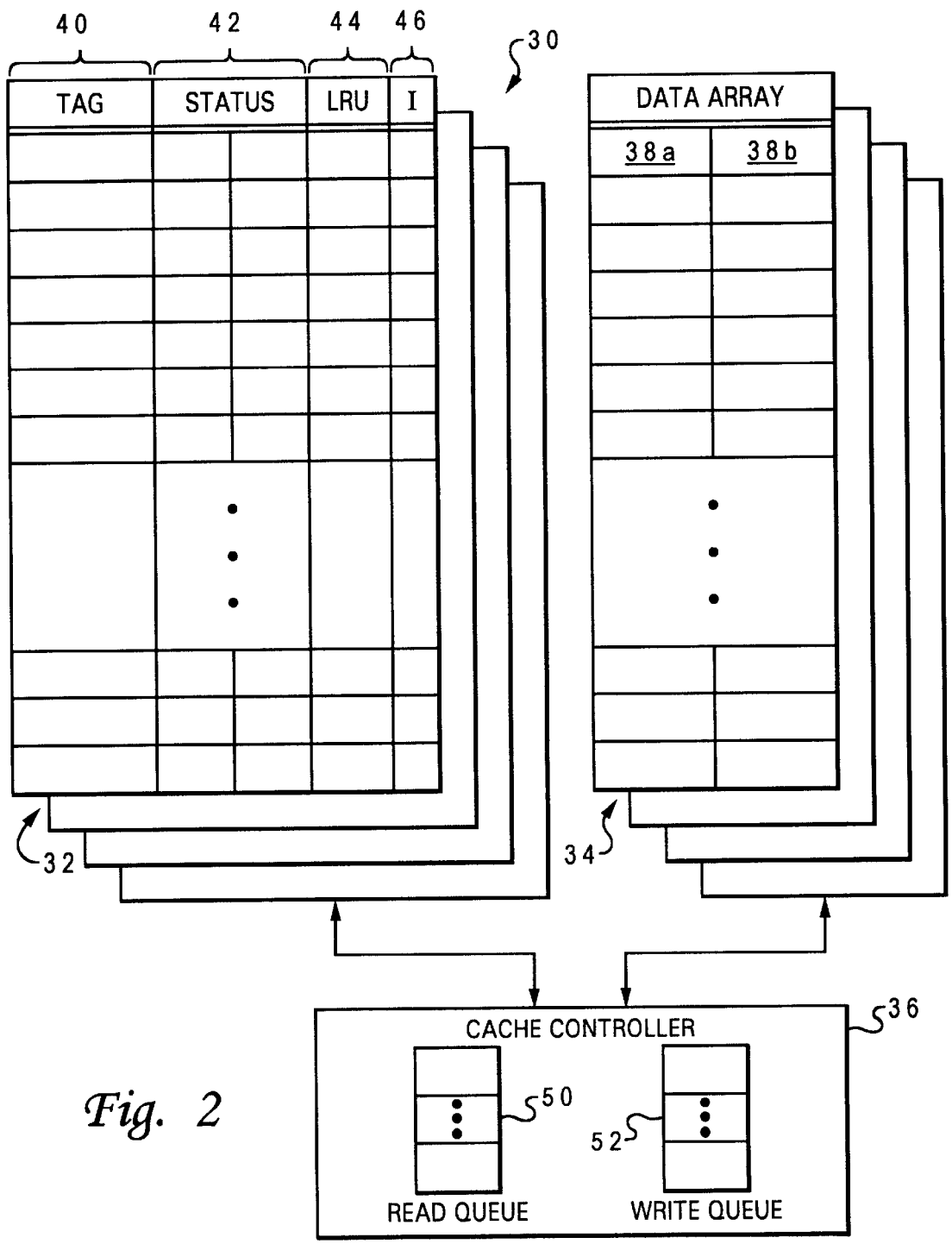
FIG. 2 is a high level block diagram of a cache in accordance with the present invention.

With reference now to FIG. 2, there is depicted a more detailed block diagram of an illustrative embodiment of a cache 30 that may be utilized to implement any of L1 caches 16, L2 caches 18 and L3 caches 20 in accordance with the present invention. In the illustrative embodiment, cache 30 is a four-way set associative cache including a directory 32, a data array 34, and a cache controller 36. Accordingly, data array 34 of cache 30 comprises a number of congruence classes that each contain four ways for storing cache lines. As in conventional set associative caches, memory locations in system memories 22 are mapped to particular congruence classes within data array 34 utilizing predetermined index bits within the system memory address.

As further shown in FIG. 2, each cache line within data array 34 is sectored into two sectors 38a, 38b that can be individually accessed and modified. Although not required by the present invention, it is convenient if the sector size utilized by each cache is the same as the cache line size of the associated higher level cache, if any. For example, if L1 caches 16 have 64-byte cache lines, L2 caches 18 and L3 caches 20 preferably implement 128-byte (two 64-byte sectors) and 256-byte (two 128-byte sectors) cache lines, respectively.

The cache lines stored within data array 34 are recorded in cache directory 32, which contains one directory entry for each way in data array 34. Each directory entry comprises a tag field 40, a status field 42, a least recently used (LRU) field 44, and an inclusion field 46. Tag field 40 specifies which cache line is stored in the corresponding way of data array 34 by storing the tag bits of the system memory address of the cache line. As discussed in detail below, status field 42 separately indicates the coherency and/or consistency status of each sector of the cache line stored in the corresponding way of data array 34 utilizing predefined bit combinations. LRU field 44 indicates how recently the corresponding way of data array 34 has been accessed relative to the other ways of its congruence class, thereby indicating which cache line should be evicted from the congruence class in case of a cache miss. Finally, inclusion field 46 indicates whether or not each sector of the cache line stored in the corresponding way of data array 34 is also stored in the local memory unit (i.e., cache or system memory) at the next lowest level of the memory hierarchy.

Still referring to FIG. 2, cache controller 36 manages storage and retrieval of data within data array 34 and updates to cache directory 32 in response to signals received from the associated components of the memory hierarchy and transactions snooped on system interconnect 12. As illustrated, cache controller 36 maintains a read queue 50 and a write queue 52 from which cache controller 36 performs updates to cache directory 32 and accesses to data array 34.

Cache State Protocol

In order to reduce high latency accesses to system memories 22, the present invention introduces the O state into the cache state protocol implemented by cache controllers 36, where O state is defined as the state of a data granule (e.g., cache line or sector) in cache that is consistent with corresponding data in system memory but has unknown coherency with respect to at least data stored in the caches at the same level of the memory hierarchy (i.e., peer caches). In this definition, consistency is defined as identity of corresponding data between a cache and system memory, and coherency is defined as knowledge of which cached copy of data associated with a particular address, if any, is the correct data. Thus, a cache holding a data granule in O state has no information regarding the state of the data granule (e.g., M, E, S, or I) in remote caches.

The O state can be incorporated within any cache state protocol, such as the conventional MESI protocol discussed above or a variant thereof. In a minimal implementation of the O state in data processing system 8, L2 and L3 caches 18 and 20 utilize the O state with only the M, S and I states from the MESI protocol. In other embodiments, additional states may be utilized to maintain more state information. For example, an $O_R$ state may be utilized to signify that a cache, among its peer caches in the memory hierarchy, is the cache that has most recently received O state data and is therefore responsible for sourcing the O state data granule to another cache in a cache-to-cache transfer. An $O_M$ state may also or alternatively be utilized to designate a cache that has a shorter access latency to memory for a data granule than its peer caches and that is therefore responsible, among its peer caches, for sourcing the O state data granule to another cache in a cache-to-cache transfer. As discussed below, this cache state can be explicit in a cache directory (e.g., in L3 caches 20) or can be implicit in the snoop responses and combined responses of the system interconnect communication protocol. In addition, an $I_P$ state may be utilized to signify that a data granule formerly held in O or $O_R$ state is known to be invalid and therefore should not be prefetched from lower level cache or memory. A summary of state transitions for the O, $O_R$, and $I_P$ cache states is given below in Table I. For operations and state transitions not listed in Table I, the $I_P$ state otherwise behaves and interacts with other states like the conventional MESI Invalid (I) state.

TABLE I

| Initial state | Operation | Next state | Comments |
|---|---|---|---|
| I | prefetch hint or read another sector of cache line | O (or $O_R$ if used) | coherence of 0 (or $O_R$) state sector unknown since not snooped |
| $I_P$ | prefetch hint or read another sector of cache line | $I_P$ | no prefetch performed due to cached modified data |
| O or $O_R$ | read request by any snooper and peer cache gives modified snoop | $I_P$ | $I_P$ inhibits future prefetches for sector |

TABLE I-continued

| Initial state | Operation | Next state | Comments |
|---|---|---|---|
| $O_R$ | response source sector to another cache that stores sector in $O_R$ state | O | other cache assumes responsibility for sourcing O state sector |
| O or $O_R$ | data request by any snooper and combined response is shared or null | S | coherence of sector can be determined from combined snoop response |
| O or $O_R$ | any write | I | data in O state is an image of memory and is therefore invalid if a cache holds modified data |

System Interconnect Communication Protocol

The snoop responses and combined responses utilized to govern communication of data on system interconnect 12 depend upon the cache state protocol implemented by L2 cache 18 and L3 cache 20. Assuming that L2 caches 18 and L3 caches 20 have sectored cache lines containing two sectors each (as shown in FIG. 2), that separate cache states are maintained for each sector, and that of the various possible cache line states, L2 caches 18a–18c implement the M, S, I, O and $O_R$ states, and L3 caches 20a–20c implement the M, S, I, and O states, the relative priorities of data sources for a request issued on interconnect 12 are as follows (from highest to lowest):

(1) an L2 cache or L3 cache holding the requested sector in M state;

(2) the L3 cache beneath the requester (i.e., the local L3 cache) holding the requested sector in S state;

(3) an L2 cache holding the requested sector in $O_R$ state;

(4) the local L3 cache holding the requested sector in O state;

(5) the L3 cache coupled to the system memory storing the requested sector (in S or O state); and (6) system memory.

In order to implement this priority scheme, data processing system 8 implements the snoop responses shown in Table II, which lists the snoop responses in order of descending priority.

TABLE II

| Snoop response | Comment |
|---|---|
| Retry | retry the request |
| MOD | driven by an L2 or L3 cache holding requested sector in M state |
| L3S | driven by the local L3 cache if it holds the requested sector in S state |
| L2O | driven by an L2 cache holding the requested sector in $O_R$ state |
| L3O | driven by the local L3 cache if it holds the requested sector in O state |
| Null | default response of any snooper |

In addition to providing one of the snoop responses given in Table II in response to each request, snoopers within data processing system 8 may also provide a prefetch flag with the snoop response indicating information regarding prefetching of the non-requested sector. In the embodiment of FIG. 3, the prefetch flags that may be provided in or with the snoop response include NP ("no prefetch"), which indicates that the non-requested sector should not be sourced to the requestor, for example, because the snooper holds the non-requested sector in M state, and LP ("L3 prefetch"), which the local L3 cache provides if it holds the non-requested sector in O or S state to indicate that it will source the non-requested sector. Thus, the priority of data sources for the non-requested sector are: (1) the local L3 cache in S or O state; and (2) the L3 cache coupled to the system memory storing the sector or the system memory itself.

As noted above, the snoop responses (including prefetch flag(s), if any) are compiled by response logic 24, which provides one of the combined responses given in Table III to all snoopers coupled to system interconnect 12. In general, the combined response designates the snooper driving the highest priority snoop response as the source of the requested data.

TABLE III

| Combined response | Comment |
| --- | --- |
| Retry | requestor must retry the request |
| MOD | L2 or L3 cache holding requested sector in M state will source data |
| L3S | local L3 cache holding the requested sector in S state will source data |
| L2O | L2 cache holding the requested sector in $O_R$ state will source data |
| L3O | local L3 cache holding the requested sector in O state will source data |
| Null | data will be sourced by the L3 cache in front of system memory from S or O state or from the system memory itself |

The prefetch flags that may be passed with or in the combined response include NP, indicating that no data will be sourced for the non-requested sector, and LP, indicating that the local L3 cache will source the non-requested sector. If neither NP or LP is asserted, data for the non-requested sector will be sourced from the L3 cache in front of system memory, which may be required to fetch the data from system memory.

Referring now to FIG. 3, a state transition table 60 is given that summarizes cache state transitions, snoop responses and combined responses for various operating scenarios of data processing system 8. State transition table 60 assumes that L2 caches 18a–18c implement the M, S, I, O and $O_R$ states (the $O_R$ state is designated simply as R), that L3 caches 20a–20c implement the M, S, I, and O states, and that snoopers implement the system interconnect protocol described above.

Rows 62–80 of state transition table 60 illustrate state transitions due to requests issued by L2 cache 18a on system interconnect 12 to fill sector 0 with requested data identified by a memory address associated with a storage location in system memory 22c. As shown in row 62, if both the requested sector and the non-requested sector are invalid in all caches coupled to system interconnect 12, all of L2 cache 18 and L3 caches 20 provide Null snoop responses to the request. Response logic 24 compiles these Null snoop responses and issues a Null combined response, which causes system memory 22c to source both the requested sector (sector 0) and the non-requested sector (sector 1) to L2 cache 18a via L3 cache 20c. L2 cache 18a holds the requested sector in S state and holds the non-requested sector in $O_R$ state. In addition, local L3 cache 20a allocates a cache line for the data and stores the requested sector and non-requested sector in S state and O state, respectively.

If, as shown in row 64, L3 cache 20a holds the non-requested sector in O state and L3 cache 20c holds the requested sector in O (or $O_M$) state, all snoopers drive Null snoop responses, and L3 cache 20a asserts the LP prefetch flag to indicate that it can source the non-requested sector. Response logic 24 then compiles the Null snoop responses and issues a Null combined response with the LP prefetch flag set. This combined response instructs L3 cache 20c to source the requested sector (sector 0) and L3 cache 20a to source the non-requested sector (sector 1) to L2 cache 18a. L2 cache 18a thereafter holds the requested sector in S state and holds the non-requested sector in $O_R$ state. Local L3 cache 20a also snoops the requested sector and stores the requested sector in S state. L3 cache 20a does not update the state of the non-requested sector, however, because the system memory address associated with the non-requested sector was not snooped.

Row 66 depicts a similar scenario in which L3 cache 20c stores the sector requested by L2 cache 18a in S state, and L3 cache 20a stores the non-requested sector in S state. The same snoop responses and combined response are provided in this example, and the same caches source the requested and non-requested sectors to L2 cache 18a. L2 cache 18a thereafter holds the requested sector in S state and holds the non-requested sector in $O_R$ state. Local L3 cache 20a also snoops the requested sector and stores the requested sector in S state. L3 cache 20a does not update the state of the non-requested sector from the S state.

Referring now to row 68, an operating scenario is given in which L3 cache 20a holds the requested sector in O state and L3 cache 20c holds the non-requested sector in O state. In response to the request by L2 cache 18a, L2 caches 18a–18c and L3 caches 20b–20c all provide Null snoop responses, and L3 cache 20a provides an L3O snoop response to indicate that the local L3 cache holds the requested sector in O state. Response logic 24 compiles these snoop responses and issues an L3O combined response indicating that L3 cache 20a is to source the requested sector and L3 cache 20c is to source the non-requested sector. After caching the data, L2 cache 18a holds the requested sector in S state and holds the non-requested sector in $O_R$ state. In addition, local L3 cache 20a caches the requested sector in S state and caches the non-requested sector in O state.

Row 70 depicts a similar scenario in which local L3 cache 20a stores the sector requested by L2 cache 18a in S state, and L3 cache 20c stores the non-requested sector in S state. In response to the request by L2 cache 18a, L2 caches 18a–18c and L3 caches 20b–20c all provide Null snoop responses, and L3 cache 20a provides an L3S snoop response to indicate that the local L3 cache holds the requested sector in S state. Response logic 24 compiles these snoop responses and issues an L3S combined response indicating that L3 cache 20a is to source the requested sector and L3 cache 20c is to source the non-requested sector. After caching the sourced data, L2 cache 18a holds the requested sector in S state and holds the non-requested sector in $O_R$ state. In addition, local L3 cache 20a caches the requested sector in S state and caches the non-requested sector in O state.

With reference now to row 72, an operating scenario is given in which L2 cache 18b stores both the requested sector and the non-requested sector in $O_R$ state, L3 cache 20a stores both sectors in O state, L3 cache 20b stores the non-requested sector in M state, and L3 cache 20c stores both sectors in O state. As shown, L2 caches 18a and 18c and L3 cache 20c all provide Null snoop responses, L3 cache 20b provides a Null snoop response with the NP prefetch flag set, L2 cache 18b provides an L2O snoop response, and L3 cache 20a provides an L3O snoop response with the LP prefetch flag set. Because L2 cache 18b is the most preferred source of the requested sector and a modified copy of the non-requested sector exists, as evidenced by the assertion of the NP prefetch flag in a snoop response, response logic 24 provides an L2O combined response with the NP flag set, which instructs L2 cache 18b to source the requested sector and inhibits sourcing of the non-requested sector. After the requested sector is sourced to L2 cache 18a, the states of the sectors in L2 cache 18a are S and I, respectively. L3 caches 20a and 20c are also able to upgrade the states of their copies of requested sector from O to S.

If the scenario shown in row 72 were altered such that L3 cache 20b did not hold a valid copy of the non-requested sector and the communication protocol permitted L2 caches 18 to source non-requested sectors (e.g., through the inclusion of an L2P prefetch flag having higher priority than the LP prefetch flag), L2 cache 18b would source both the requested sector and the non-requested sector to L2 cache 18a and update the state of its copy of the non-requested sector from $O_R$ to O.

Row 74 of state transition table 60 illustrates an operating scenario in which L2 cache 18b stores both the requested sector and the non-requested sector in M state, L3 cache 20a stores both sectors in O state, L3 caches 20a and 20c stores the requested sector in O state, and L3 cache 20c stores the non-requested sector in O state. As depicted, L2 caches 18a and 18c and L3 cache 20b and 20c all provide Null snoop responses, L3 cache 20b provides a MOD snoop response with the NP prefetch flag set, and L3 cache 20a provides an L3O snoop response. In response to these snoop responses, response logic 24 provides an MOD combined response with the NP flag set, which indicates that L2 cache 18b is to source the requested sector and that the non-requested sector will not be sourced. After the requested sector is sourced to L2 cache 18a, the states of the sectors in L2 cache 18a are S and I, respectively. L3 caches 20a and 20c are also able to upgrade the states of their copies of requested sector from O to S.

Referring now to row 76 of state transition table 60, an operating scenario is given in which requesting L2 cache 18a stores the non-requested sector in O state, and L3 cache 20c stores both the requested sector and the non-requested sector in O state. As shown, in response to the request by L2 cache 18a, L2 caches 18b–18c and L3 caches 20a–20c provide Null snoop responses, and L2 cache 18a provides a Null snoop response with the NP prefetch flag set to inhibit prefetching of the non-requested sector because L2 cache 18a already stores an image of system memory in that sector. Response logic 24 compiles these snoop responses and issues a Null combined response with the NP prefetch flag set, which causes L3 cache 20c to source the requested sector and inhibits sourcing of the non-requested sector. At the conclusion of the transaction, L2 cache 18a stores the requested sector in S state, and L3 cache 20a snoops the requested sector and also caches it in S state. L3 cache 20c also updates the state of the requested sector from O to S.

Row 78 of state transition table 60 summarizes an operating scenario in which prior to the data request by L2 cache 18a, L2 cache 18b stores the requested sector in $O_R$ state, caches 18a and 20c store the non-requested sector in S state, and L3 cache 18a stores the non-requested sector in O state. In response to the request by L2 cache 18a, L2 cache 18c and L3 caches 20b and 20c issue Null snoop responses, L2 cache 18a issues a Null response with the NP flag set since it already stores the non-requested sector in S state, L2 cache 18b issues an L2O snoop response, and L3 cache 20a issues a Null snoop response with the LP prefetch flag set. Response logic 24 compiles these snoop responses and issues an L2O combined response with the NP prefetch flag set. As a result, L2 cache 18b sources the requested sector to L2 cache 18a, and prefetching of the non-requested sector is inhibited. Thereafter, L2 caches stores the requested sector in S state, local L3 cache 20a allocates the requested sector and stores it in S state, and L2 cache 18b updates the state of its copy of the requested sector from $O_R$ to S. A similar operating scenario is given in row 80, which differs only in that L2 cache 18a inhibits prefetching of the non-requested sector since it stores it in M state, and local L3 cache 20a sources the requested sector, which L3 cache 20a stores in S state, to L2 cache 18a. Accordingly, in this example, only the state of the requested sector transitions (from I to S state).

Referring now to rows 82–86 of state transition table 60, three operating scenarios are given in which a cache holding a sector in an O state (i.e., O state or a variant thereof) updates the state of the sector through issuing an address-only query on system interconnect 12. Such address-only queries would preferably be very low-priority transactions that are utilized to update cache states during periods of low cache activity (and low bus demand if system interconnect 12 is a shared bus). Any cache having the specified sector in an O state can upgrade the state of the sector to at least S state if no snooper responds with a MOD snoop response, but all snooping caches holding non-modified copies of the sector (or at least all snooping caches in an O state) must invalidate their copies if a snooper responds within a MOD snoop response.

As illustrated, row 82 summarizes an operating scenario in which L3 cache 20a issues an address-only query specifying the memory address in system memory 22c associated with sector 0, which L3 cache 20a holds in O state. In response to the address-only query, all caches issue a Null snoop response except L2 cache 18b, which provides an L2O snoop response to indicate that it holds the specified sector in $O_R$ state. Response logic 24 compiles these snoop responses and issues an L2O combined response, which signifies to all snoopers that no snooper holds the specified sector in M state. Accordingly, both L2 cache 18b and L3 cache 20a upgrade the state of the specified sector to S state. And because the transaction code of the transaction identified it as an address-only query, neither the specified sector nor the non-specified sector is sourced on system interconnect 12.

Row 84 illustrates another example of an operating scenario in which L2 cache 18c issues an address-only query specifying a system memory address in system memory 22c for which L2 cache 18c stores associated data in sector 0 in $O_R$ state and L2 cache 18a and L3 cache 20c store associated data in S state. In response to this address-only query, all caches provide Null snoop responses, and response logic 24 accordingly provides a Null combined response. As a result, L2 cache 18c upgrades the state of sector 0 from $O_R$ state to S state.

Referring now to row 86, an exemplary operating scenario is given in which L3 cache 20a issues an address-only query specifying a memory address in system memory 22c for which L3 cache 20a stores data in O state, L2 cache 18b stores data in M state, and L3 cache 20c stores data in S state. As shown, L2 cache 22b issues a MOD snoop response, and all other snoopers issue Null snoop responses.

Accordingly, response logic 24 issues a MOD combined response, and L3 caches 20a and 20c both downgrade the states of their copies of the specified sector to I state.

Although not illustrated in state transition table 60, in embodiments in which the system interconnect communication protocol provides a Null combined response to an address-only query only when peer caches of the requesting cache do not have a copy of the specified sector, the requesting cache can update the state of the specified sector from an O state to E state.

Hierarchical Implementation of $O_R$ State

As noted above, the $O_R$ state is utilized to indicate which cache (if any), from among the caches connected to a common interconnect, is responsible for sourcing requested or prefetch data from O state. As shown in the exemplary processing scenarios outlined above, only one cache at a particular level of the memory hierarchy can have a particular data granule stored in $O_R$ state at a time. However, when a data processing system includes multiple snooped interconnects, one cache on each separately snooped interconnect can have the same data stored in $O_R$ state.

Figure 4:
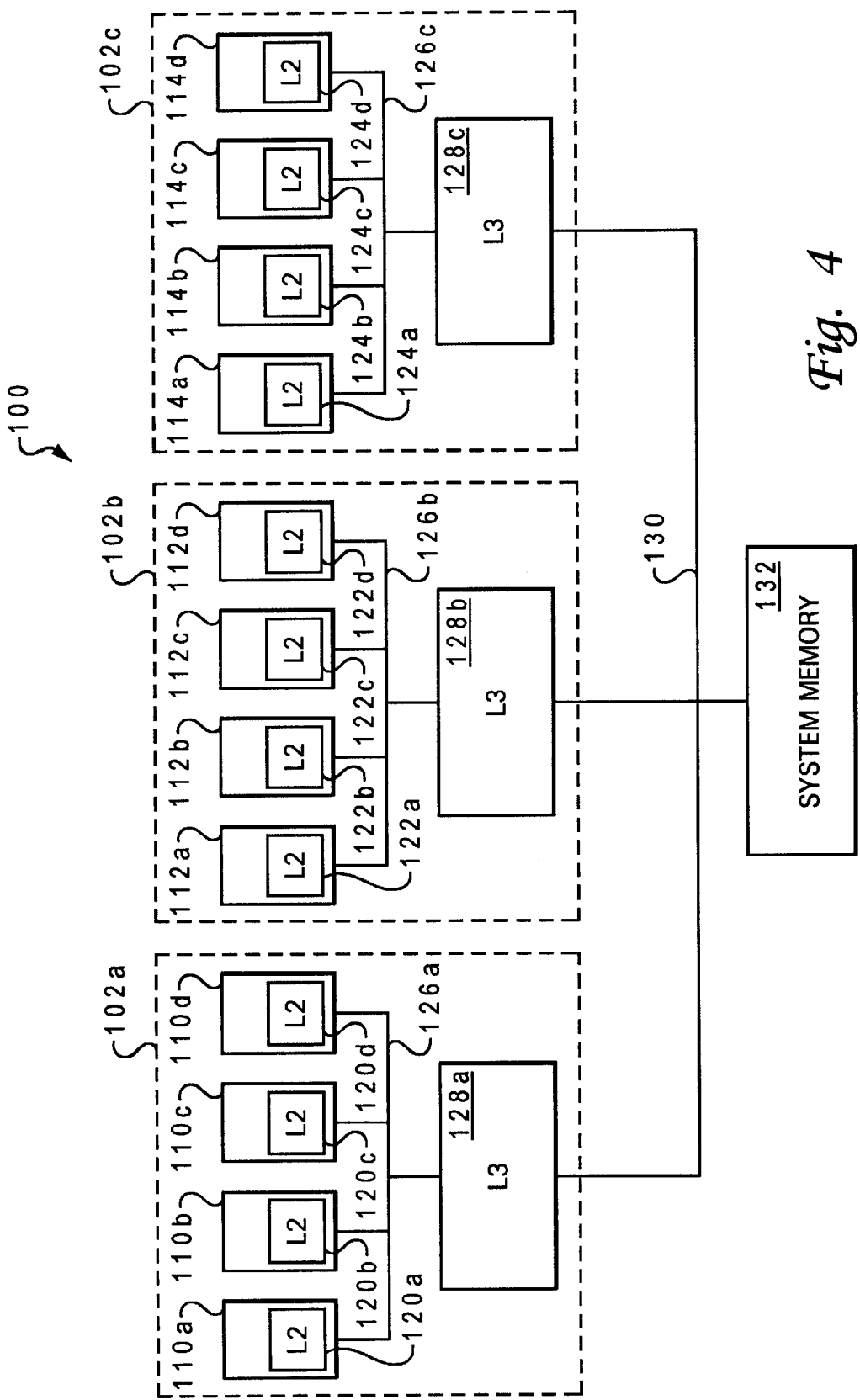
FIG. 4 is a block diagram depicting an illustrative embodiment of a second data processing system in accordance with the present invention, which has a hierarchical interconnect structure.

For example, with reference now to FIG. 4, there is illustrated a block diagram of a second data processing system in accordance with the present invention, which has a hierarchical interconnect structure and can support multiple caches concurrently storing the same data granule in $O_R$ state. As depicted, data processing system 100 includes three clusters 102a–102c, which are each connected to a lower level interconnect 130 to which system memory 132 and other interconnects and devices may be coupled. Clusters 102a–102c are of identical construction, and each contains an upper level interconnect 126 to which four processing units (respectively identified by reference numerals 110a–110d, 112a–112d, and 114a–114d) and an L3 cache 128 are connected. As with processing units 10 of FIG. 1, the processing units depicted in FIG. 4 each contain an L2 cache.

In a preferred embodiment, the $O_R$ state is implemented hierarchically with the following rules:

(1) $O_R$ designates one cache among the peer caches commonly connected to a snooped interconnect that is responsible for sourcing data in O state to other peer caches coupled to the snooped interconnect;

(2) a cache holding data in $O_R$ state can also source the data to an associated higher level cache within the cache hierarchy (i.e., a higher level cache in the same cluster); and (3) the most recent recipient of prefetch data enters $O_R$ state and must thereafter transition to O state when another peer cache enters $O_R$ state.

As an example of the operation of $O_R$ state in a hierarchical implementation, assume that L2 cache 120a, which has cache state of I/I for the sectors of a particular cache line, issues a read request for sector 0 of the cache line. The cache states of L2 caches 110b–110d for the cache line in question are I/I, $O_R$/I, and O/I, respectively, and the cache states of L3 caches 128a–128c are S/I, O/O, and O/$O_R$, respectively. Because L3 cache 128a records S state for the requested sector, it is known that the requested sector in not modified in another cache. Therefore, L2 cache 120c sources the requested sector to L2 cache 120a and transitions to S state. In addition, L3 cache 128a forwards the read request to lower level interconnect 130 in order to prefetch the non-requested sector (sector 1). In response to snooping the read request, L3 cache 12c sources sector 1 and updates the state of sector 1 to O state. L3 cache 128a updates the state of sector 1 to $O_R$ state and supplies sector 1, the prefetch data, to L2 cache 120a. L2 cache 120a then updates the states of sectors 0 and 1 to S and $O_R$, respectively.

As has been described, the present invention provides an improved cache state protocol that permits memory-consistent data of unknown coherency to be stored in the cache memory of a data processing system in an O state in order to reduce access latency to an image of memory. Advantageously, the present invention permits the state of such memory-consistent data to be updated both in response to snooping request transactions issued by other caches and in response to address-only queries and conditional read transactions issued by the cache storing data in O state. In addition, data held in O state may be sourced to other caches, both as requested data and as prefetch (non-requested) data through the implementation of the $O_R$ and/or $O_M$ states.

While the invention has been particularly shown and described with reference to a preferred embodiment, it will be understood by those skilled in the art that various changes in form and detail may be made therein without departing from the spirit and scope of the invention.

What is claimed is:

1. A cache for use in a data processing system having a memory and a peer cache, said cache comprising:

data storage including a plurality of granules of data; and a plurality of state fields associated with said plurality of granules of data, wherein each state field among said plurality of state fields has a plurality of possible states including a first state indicating that an associated granule is consistent with corresponding data in the memory and has unknown coherency with respect to a corresponding valid data granule held in said peer cache.

2. A processing unit for use in a data processing system having a memory and a peer cache, comprising:

a processor core; and a cache hierarchy including at least one cache, said cache including:

data storage including a plurality of granules of data; and a plurality of state fields associated with said plurality of granules of data, wherein each state field among said plurality of state fields has a plurality of possible states including a first state indicating that an associated granule is consistent with corresponding data in the memory and has unknown coherency with respect to a corresponding valid data granule held in the peer cache.

3. A data processing system, comprising:

an interconnect and a plurality of processing units coupled to said interconnect;

at least one system memory coupled to said plurality of processing units;

a plurality of caches coupled to said plurality of processing units, wherein a cache among said plurality of caches includes:

data storage including a plurality of granules of data; and a plurality of state fields associated with said plurality of granules of data, wherein each state field among said plurality of state fields has a plurality of possible states including a first state indicating that an associated granule is consistent with corresponding data in said system memory and has unknown coherency with respect to a corresponding valid data granule held in another of said plurality of caches.

4. A method of tracking status of data in a cache of a data processing system having a memory and a plurality of caches, said method comprising:

storing a plurality of granules of data in a cache among a plurality of caches;

storing a corresponding valid data granule in a peer cache among said plurality of caches; and setting a state field associated with a first granule among said plurality of granules to a first state among a plurality of possible states to indicate that said first granule is consistent with corresponding data in the memory and has unknown coherency with respect to said corresponding valid data granule held in said peer cache.

5. The cache of claim 1, said plurality of states including at least a second state indicating that an assocaited granule of data is inconsistent with corresponding data in the memory and a third state indicating that an associated granule of data is coherent with corresponding data in the peer cache.

6. The cache of claim 5, wherein said third state further indicates that said associated granule of data is consistent with corresponding data in the memory.

7. The cache of claim 1, wherein each of said plurality of granules of data is a sector of a cache line.

8. The cache of claim 1, wherein said cache, the memory and the peer cache belong to a memory hierarchy having at least one lower level, said cache further comprising a cache controller that sets each of said plurality of state fields to one of said plurality of states, wherein said cache controller sets a state field among said plurality of state fields to said first state in response to said cache loading, into an associated data granule, data supplied from said lower level that is not required by said cache to satisfy a data request.

9. The data processing system of claim 2, said plurality of states including at least a second state indicating that an associated granule of data is inconsistent with corresponding data in said system memory and a third state indicating that an associated granule of data is coherent with corresponding data in others of said plurality of caches.

10. The data processing system of claim 9, wherein said third state further indicates that said associated granule of data is consistent with corresponding data in said system memory.

11. The data processing system of claim 2, wherein each of said plurality of granules of data is a sector of a cache line.

12. The data processing system of claim 2, wherein said plurality of caches and said at least one system memory belong to a memory hierarchy having at least one lower level below said cache, said cache futher comprising a cache controller that sets each of said plurality of state fields to one of said plurality of states, wherein said cache controller sets a state field among said plurality of state fields to said first state in response to said cache loading, into an associated data granule, data supplied from said lower level that is not required by said cache to satisfy a data request.

13. The data processing system of claim 12, said memory hierarchy including at least one upper level above said cache.

14. The method of claim 4, and further comprising:

setting a state field associated with a second granule among said plurality of granules to a second state to indicate that said second granule of data is inconsistent with corresponding data in the memory; and setting a state field associated with a third granule among said plurality of granules to a third state to indicate that said third granule is coherent with corresponding data in peer caches among the plurality of caches.

15. The method of claim 14, wherein setting said state field associated with said third granule to said third state further indicates that said associated granule of data is consistent with corresponding data in the memory.

16. The method of claim 4, wherein storing a plurality of granules of data in said cache comprises storing each of said plurality of granules of data in a sector of a cache line.

17. The method of claim 4, wherein said plurality of caches and memory belong to a memory hierarchy having at least one lower level, wherein said setting step comprises setting a state field among said plurality of state fields to said first state in response to said cache loading, into said first granule, data supplied from said lower level that is not required by said cache to satisfy a data request.

\* \* \* \* \*